United States Patent
Ben-Itzhak

(10) Patent No.: US 8,087,079 B2
(45) Date of Patent: Dec. 27, 2011

(54) BYTE-DISTRIBUTION ANALYSIS OF FILE SECURITY

(75) Inventor: Yuval Ben-Itzhak, Tel-Aviv (IL)

(73) Assignee: Finjan, Inc., San Jose, CA (US)

( * ) Notice: Subject to any disclaimer, the term of this patent is extended or adjusted under 35 U.S.C. 154(b) by 1271 days.

(21) Appl. No.: 11/797,539

(22) Filed: May 4, 2007

(65) Prior Publication Data

US 2008/0276320 A1 Nov. 6, 2008

(51) Int. Cl.
*G06F 11/00* (2006.01)

(52) U.S. Cl. ............................................ 726/22; 726/25

(58) Field of Classification Search .............. 726/22–25; 713/188
See application file for complete search history.

(56) References Cited

U.S. PATENT DOCUMENTS

| | | | |
|---|---|---|---|
| 6,971,019 B1 * | 11/2005 | Nachenberg | 713/188 |
| 7,657,935 B2 * | 2/2010 | Stolfo et al. | 726/22 |
| 2004/0111632 A1 * | 6/2004 | Halperin | 713/200 |
| 2005/0177737 A1 * | 8/2005 | Takeda et al. | 713/189 |
| 2005/0281291 A1 * | 12/2005 | Stolfo et al. | 370/506 |
| 2006/0015630 A1 * | 1/2006 | Stolfo et al. | 709/230 |
| 2006/0026675 A1 * | 2/2006 | Cai et al. | 726/22 |
| 2007/0280114 A1 * | 12/2007 | Chao et al. | 370/235.1 |

OTHER PUBLICATIONS

Stolfo, Salvatore J., Wang, Ke and Li, Wei Jen, Towards Stealthy Malware Detection http://www.thc.org/root/docs/intrusion_detection/hids/Toward%20Stealthy%20Malware%20Detectio.
Stolfo, Salvatore J., Wang, Ke and Li, Wei Jen, Fileprint Analysis for Malware Detection http://www1.cs.columbia.edu/~wl318/papers/wormpaper2005.pdf, Jun. 19, 2005.
Abou-Assaleh, Tony, Cercone, Nick, Kesselj, Vlado and Swiedan, Ray, N-gram-based Detection of New Malicious Code, IEEE Proceedings of the 28th Annual International COMPSAC '04, 2004.

* cited by examiner

*Primary Examiner* — Samson Lemma
(74) *Attorney, Agent, or Firm* — Dawn-Marie Bey; King & Spalding LLP

(57) ABSTRACT

A method for scanning files for security, including receiving an unfamiliar file for scanning, if the determining indicates that the mime type is suitable for analysis, then processing a buffer of file data from the unfamiliar file, including generating a histogram of frequencies of occurrence of bytes within a buffer of file data from the unfamiliar file, excluding a designated set of bytes, and if the generated histogram of frequencies of occurrence of the non-excluded bytes deviates substantially from a reference distribution, then signaling that the unfamiliar file is potentially malicious. A system and a computer-readable storage medium are also described and claimed.

21 Claims, 4 Drawing Sheets

BYTE-DISTRIBUTION ANALYSIS OF FILE SECURITY

FIELD OF THE INVENTION

The present invention relates to computer security.

BACKGROUND OF THE INVENTION

Byte-distribution analysis is a statistical analysis technique, which has been used to classify digital data. Byte-distribution analysis generally involves examining a binary file in terms of its byte constituents. I.e., a binary file is a sequence of bytes with values i, ranging from i=0 to i=255, and each byte has a frequency of occurrence, $f_i$ within the file. Byte-analysis uses the histogram of frequencies $f_i$, $0 \leq i \leq 255$, to classify a file.

Byte analysis is described in Abou-Assaleh, T., Cercone, N., Keselj, V. and Sweidan, R., N-gram based Detection of New Malicious Code, *Proceedings of the 28th Annual International Computer Software and Applications Conference*, IEEE, 2004. N-gram analysis is a generalization of byte-distribution analysis to sequences of N consecutive bytes ($i_1, i_2, \ldots, i_N$).

Prior art implementations of byte-distribution analysis for security analysis of files have not been sufficiently robust and accurate to make their way into commercial products. Such implementations suffer from false negatives and false positives. False negatives are malicious files that elude detection, and false positives are non-malicious files that are reported as being malicious. It is thus desirable to find an implementation of byte-distribution analysis that has low enough margins of false negatives and false positives, that warrant its commercial use.

SUMMARY OF THE DESCRIPTION

The present invention concerns a method and system for scanning files for potential security threats, using a form of byte-distribution analysis, which is commercially viable. The present invention is based on the discovery that for files of certain mime types, including inter alia media files, if known spikes are removed from their byte-distribution histogram, then the remaining parts of the histograms are approximately uniformly distributed. The locations of the spikes are designated in a byte exclusion list.

For legitimate non-malicious files of a mime type amenable to byte-distribution analysis, removable of the excluded bytes from their histograms results in an approximately uniform distribution. For malicious files, however, the histogram for the non-excluded bytes exhibits spikes. Thus, a subject file can be classified as potentially malicious if its byte-distribution histogram for the non-excluded bytes deviates substantially from a uniform distribution.

There is thus provided in accordance with an embodiment of the present invention a method for scanning files for security, including receiving an unfamiliar file for scanning, generating a histogram of frequencies of occurrence of bytes within a buffer of file data from the unfamiliar file, excluding a designated set of bytes, and if the generated histogram of frequencies of occurrence of the non-excluded bytes deviates substantially from a reference distribution, then signaling that the unfamiliar file is potentially malicious.

There is additionally provided in accordance with an embodiment of the present invention a system for scanning files for security, including a histogram generator for building a histogram of frequencies of occurrences of bytes within a buffer of file data from an unfamiliar file, excluding frequencies of a designated set of bytes, and a threshold detector for detecting if the frequencies of the non-excluded bytes deviate substantially from a reference distribution.

There is further provided in accordance with an embodiment of the present invention a computer-readable storage medium storing program code for causing a computing device to receive an unfamiliar file for scanning, to generate a histogram of frequencies of occurrence of bytes within the buffer of file data, excluding a designated set of bytes, and if the generated histogram of frequencies of occurrence of the non-excluded bytes deviates substantially from a reference distribution, then to signal that the unfamiliar file is potentially malicious.

BRIEF DESCRIPTION OF THE DRAWINGS

The present invention will be more fully understood and appreciated from the following detailed description, taken in conjunction with the drawings in which.

DETAILED DESCRIPTION

The present invention concerns analysis of files for the presence of malicious embedded code. The present invention uses byte-distribution analysis and achieves sufficient accuracy to make it commercially viable.

Figure 1:
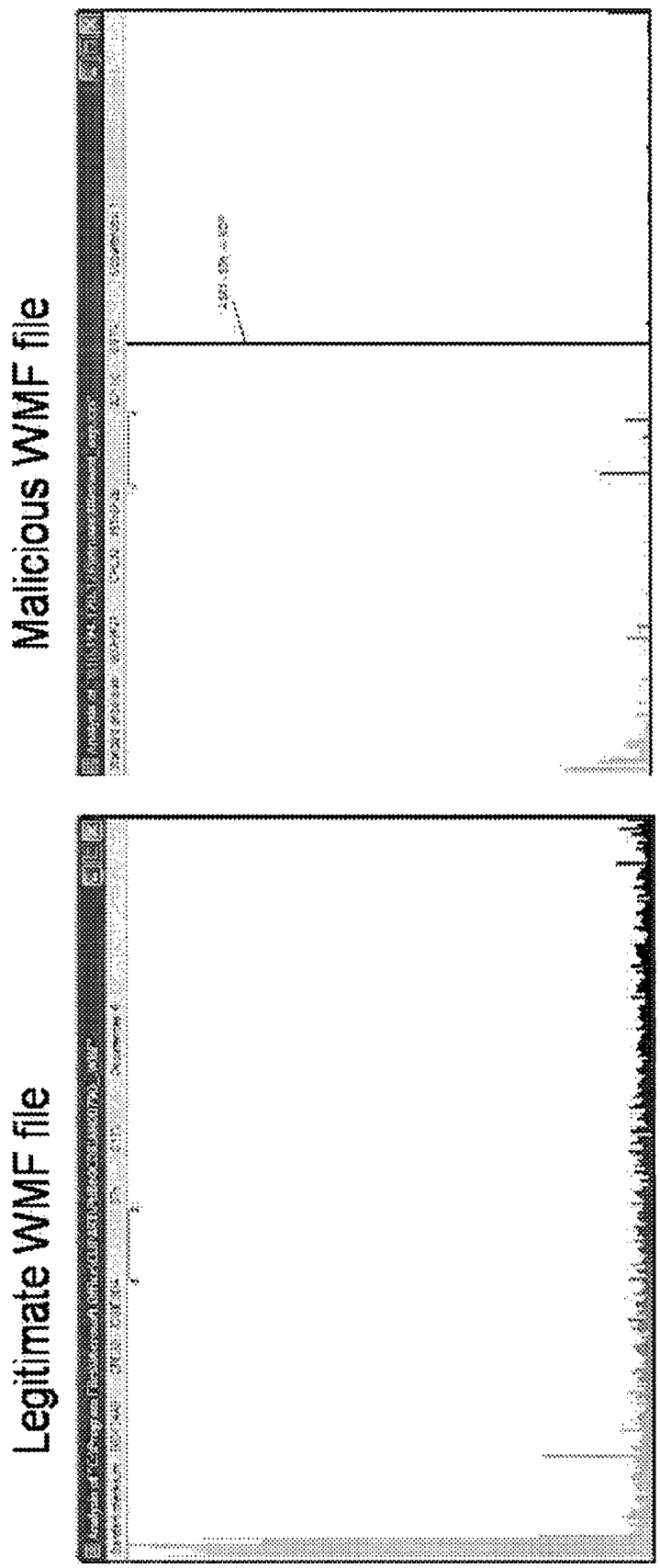
FIG. 1 is an illustration of respective histograms of a legitimate and a malicious WMF image file.

Reference is now made to FIG. 1, which is an illustration of respective histograms of a legitimate and a malicious Windows Media Format (WMF) image file. The malicious WMF file has an embedded virus. Generally, each histogram is an array of 256 frequencies $f_i$, $0 \leq i \leq 255$, where $f_i$ is the number of occurrences of byte i in the file. It will be appreciated by those skilled in the art that for non-ASCII files, such as Unicode files, where double-byte characters are used, the histograms may have more than 256 frequencies. For example, double-byte histograms have 256*256=65,536 frequencies.

FIG. 1 shows that there are striking differences between the two histograms. The legitimate WMF file has large frequencies for low byte numbers; whereas the malicious WMF file has low frequencies for low byte numbers, and a high frequency spike for a byte number in the middle.

The algorithm described herein below is designed to recognize these differences, and to issue a warning signal accordingly. Briefly, the algorithm identifies mime types for which there is approximate uniformity in their histograms, and then uses this uniformity to recognize potentially malicious files.

Figure 2:
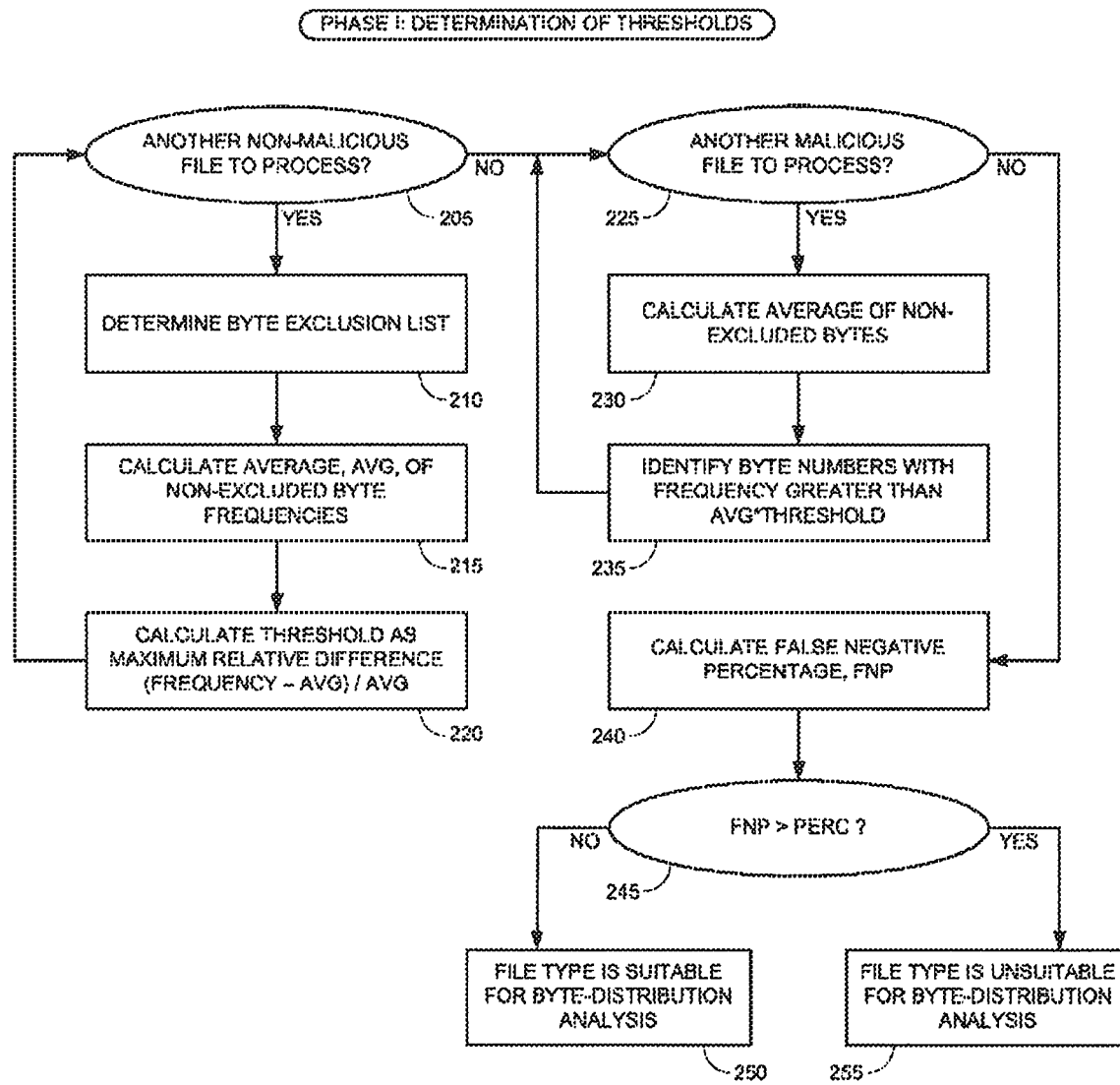
FIG. 2 is a simplified flowchart of a training phase of a method for setting parameters for byte-analysis of various mime types, in accordance with an embodiment of the present invention.

Reference is now made to FIG. 2, which is a simplified flowchart of a training phase of a method for setting parameters for byte-analysis of various mime types, in accordance with an embodiment of the present invention. The training phase is designed to identify certain threshold parameters, as described below, and to identify mime types that are suitable for byte-distribution analysis. Mime types include, inter alia, executable files, documents, and media files including image files, audio files and video files. It will be appreciated by those skilled in the art that certain file types are more amenable to byte-distribution analysis than others.

From inspection of FIG. 1 it is clear that the histogram of the legitimate WMF file is not approximately uniform, because it has high frequency values at low bytes and low frequency values at high bytes. In order to arrive at an approximately uniform distribution, the present invention excludes certain bytes, $i \in E$, as being spike outliers, where E is a subset of $\{0, 1, 2, \ldots, 255\}$. The remaining non-excluded bytes, $i \notin E$, have an approximate uniform distribution. Thus, if the spikes in the histogram for the legitimate WMF file are removed, the remaining frequencies, $f_i$, $i \notin E$, exhibit approximate uniformity. Since the spike in the histogram for the malicious WMF file, however, is at a byte location that is not a spike for the legitimate WMF file, the non-excluded bytes of the malicious file do not have approximately uniform frequencies.

The training algorithm shown in FIG. 2 is applied to each of a plurality of mime types. For each specific mime type, the training algorithm uses two training sets of files; namely, a first set of known good non-malicious files, and a second set of known bad malicious files. At step 205 the good files are processed, and a decision is made whether or not there are more good files to process. If so, then at step 210, the frequencies, $f_i$, of occurrence of each byte i, $0 \leq i \leq 255$, are calculated, and spike outlier bytes are identified. The outlier bytes are added to a set, E, of excluded bytes. It is noted that the set E is being cumulatively generated. I.e., as each good file is processed, the outlier bytes identified at step 210 are included in the set E.

Generally, a byte i is classified as an outlier if the frequency $f_i$ differs from the average of all of the frequencies by more than a percentage of the average, such as 30% of the average.

At step 215 the average, AVG, of the non-excluded frequencies is calculated; namely, $$AVG = \frac{1}{n} \sum_{i \in E} f_i, \quad (1)$$

where n is the number of non-excluded bytes. At step 220 a threshold, $\tau$, is defined by $$\tau = \max\left(\tau, \max_{i \notin E} \frac{|f_i - AVG|}{AVG}\right), \quad (2)$$

i.e., $\tau$ is the largest absolute ratio $$\left|\frac{f_i - AVG}{AVG}\right|,$$

over the non-excluded bytes i, for all good files. It is noted that the threshold, $\tau$, is being cumulatively generated. I.e., as each good file is processed, the threshold $\tau$ is increased if an absolute ratio $$\left|\frac{f_i - AVG}{AVG}\right|$$

exceeds the current value of $\tau$. It will be appreciated by those skilled in the art that alternatively the threshold $\tau$ may be computed in a separate loop over the good files, after the loop with steps 205-215 is completed and the set E, of excluded bytes, has been completely cumulated.

Processing then returns to step 205. If all of the good files have been processed, then processing advances to step 225 and the bad files are processed. At step 225 a decision is made whether there are more bad files to process. If so, then at step 230 the average in EQUATION 1 is calculated for the next bad file to be processed, where $f_i$ is the frequency of occurrence of byte i in the bad file. At step 235 byte numbers, i, are determined for which $$|f_i - AVG| > AVG * \tau. \quad (3)$$

where $\tau$ is the threshold parameter determined from the good files, as above in EQUATION 2. The frequencies satisfying EQUATION 3 are considered as violating approximate uniformity, and in turn such violation signals that the file is potentially malicious. If none of the frequencies, $f_i$, satisfy EQUATION 3, then the bad file being processed has eluded the test, and is considered a false negative.

Processing then returns to step 225. If all of the bad files have been processed, then processing advances to step 240 where the percentage of false negatives is calculated; namely, the ratio of bad files that eluded the test, divided by the total number of bad files that were tested. At step 245 a decision is made whether the percentage of false negatives is greater than a pre-designated percentage, PERC; for example, PERC=50%. If not, then at step 250 the specific mime type being tested by the training algorithm is designated as suitable for byte-distribution analysis. Otherwise, if the percentage of false negatives is greater than PERC, then at step 255 the specific file type being tested by the training algorithm is designated as unsuitable for byte-distribution analysis.

After processing the training algorithm of FIG. 2, the parameters E and $\tau$, derived for each specific mime type, are saved as configuration parameters for scanning files of the specific mime type.

Figure 3:
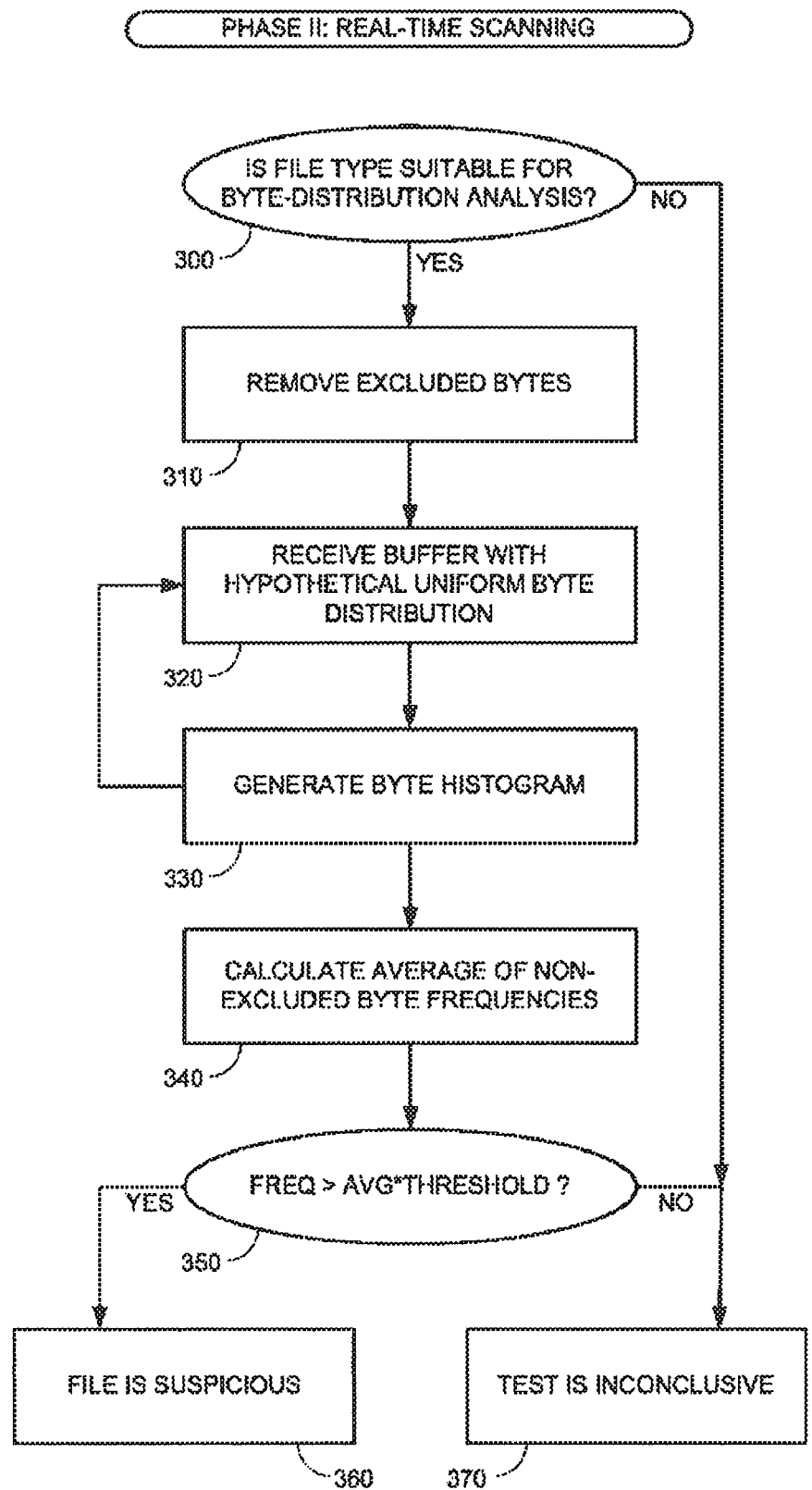
FIG. 3 is a simplified flowchart of a method for scanning files using byte-distribution analysis and identifying potentially malicious files, in accordance with an embodiment of the present invention.

Reference is now made to FIG. 3, which is a simplified flowchart of a method for scanning files using byte-distribution analysis and identifying potentially malicious files, in accordance with an embodiment of the present invention. The scanning phase operates on a specific file being analyzed for potentially malicious code therein.

At step 300 a decision is made whether the mime type of the file to be analyzed is one of the types deemed suitable for byte-distribution analysis in the training phase. If not, then processing advances to step 370 and no conclusion can be made.

Otherwise, if the file is of a type deemed suitable for byte-analysis, then at step 310 the bytes $i \in E$ are excluded, where E is the list of excluded bytes determined in the training phase. At step 320 a buffer of a designated size of bytes from the file is received. The size of the buffer is a parameter, BUFFER_SIZE. It will be appreciated by those skilled in the art that use of a fixed size buffer for byte-distribution analysis has several advantages. It serves to control the size of the data stream being statistically analyzed, since files input to the scanning algorithm may be of arbitrary sizes.

At step 330 a byte-distribution histogram of frequencies, $f_i$, $i \notin E$, is generated. Generally, steps 330 and 340 are repeated until the entire file is processed. Alternatively, if the file is very large, then steps 330 and 340 may be repeated until a designated number of bytes have been processed; or in some instances, depending on the size of BUFFER_SIZE, steps 330 and 340 may be performed only once, without repetition.

At step 340 the average in EQUATION 1 is calculated. At step 350 a decision is made whether any of the frequencies $f_i$, $i \notin E$, satisfies EQUATION 3, thereby violating the approximate uniformity. If so, then at step 360 the file is deemed potentially malicious. Otherwise, if none of the frequencies $f_i$, $i \notin E$, satisfy EQUATION 3, then no conclusion is made.

The following is an example of a configuration file used in the scanning phase for GIF image files, with parameters that were determined in the training phase.

```
<ByteDistribution>
    <Algorithm="Uniform Byte Distribution">
        <Mime="image/gif">
            <ExclusionListValue="41 42 43 71 185"/>
            <ThresholdValue='3.2'/>
            <BufferSize='10240'/>
            <DefaultHeaderSize='20'/>
            <DefaultTrailerSize='15'/>
        </Mime>
    <Algorithm/>
</ByteDistribution>
```

Generally, each mime type has a unique configuration file. The Parameters DefaultHeaderSize and DefaultTrailerSize are header and trailer sizes of histograms that are treated as outliers. A DefaultHeaderSize of 20 indicates that bytes 0-19 are treated as outliers, and a DefaultTrailerSize of 15 indicates that bites 241-255 are treated as outliers.

Figure 4:
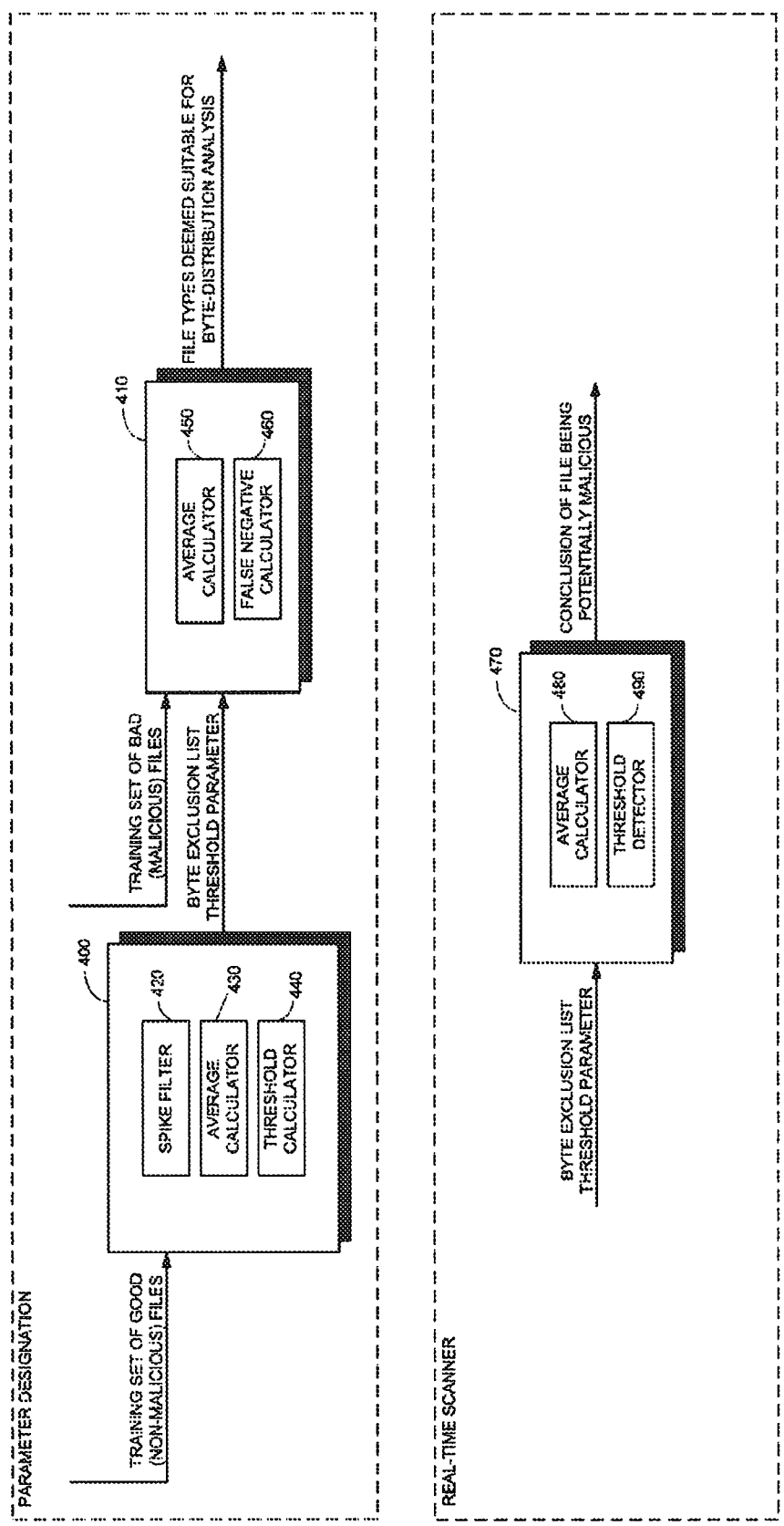
FIG. 4 is a simplified block diagram of a system for real-time security scanning using byte-distribution, in accordance with an embodiment of the present invention.

Reference is now made to FIG. 4, which is a simplified block diagram of a system for real-time security scanning using byte-distribution, in accordance with an embodiment of the present invention. The diagram of FIG. 4 includes two components; namely, a parameter designation component for setting parameters, and a real-time scanning component.

The parameter designation component includes a processor 400 for processing a training set of good, i.e., non-malicious files, and a processor 410 for processing a training set of bad, i.e., malicious files. The two training sets include files of a specific mime type, such as MPEG image files, or MP3 audio files, or MP4 video files.

Processor 400 includes a spike filter 420, for identifying spikes in a histogram of byte frequencies for a file from the training set of good files. Spike filter 420 generates a list of bytes to be excluded, in order that the remaining bytes have an approximate uniform distribution.

Processor 400 further includes an average calculator 430, for calculating an average frequency, AVG, for the non-excluded bytes. Average calculator 430 uses EQUATION 1 above to calculate the value of AVG.

Processor 400 further includes a threshold calculator 440, for calculating a threshold, $\tau$, according to EQUATION 2 above.

The output of processor 400 includes a list of excluded bytes and a threshold, which in turn are inputs to processor 410.

Processor 410 includes an average calculator 450, for calculating an average frequency, AVG, for a file from the training set of bad files. Average calculator 450 uses EQUATION 1 above to calculate the value of AVG. Processor 410 also includes a false negative calculator for checking whether or not a frequency of occurrence of a non-excluded byte in the file deviates from AVG substantially, according to EQUATION 3. If not, then the bad file being processed has eluded the byte-distribution test, and represents a false negative.

The output of processor 410 includes an indication of whether or not the mime type of the files being tested is deemed suitable for byte-distribution analysis. Thus, after the parameter designation component of FIG. 4 has processed the training sets of files for various mime types, the parameters for each mime type have been designated and the suitabilities of the mime types for byte-distribution analysis have been determined.

The real-time scanning component of FIG. 4 includes a processor 470 for scanning a file of a specific mime type, using byte-distribution. The input to processor 470 includes a list of byte values to be excluded from consideration, and a threshold value, $\tau$, as used in EQUATION 3. In addition, the input to processor 470 includes a list of mime types deemed to be suitable for byte-distribution analysis.

Processor 470 generally does not operate on the entire input file. Instead, a fixed length buffer of data from the input file is analyzed. Processor 470 includes an average calculator 480, for calculating an average, AVG, of frequencies of occurrences of bytes, for the non-excluded byte values, for the data in the buffer. Average calculator 480 uses EQUATION 1 to calculate the value of AVG. Processor 470 also includes a threshold detector 490, for determining if any of the frequencies of occurrence of a non-excluded byte deviates from AVG according to EQUATION 3. If so, the subject file is signaled as being potentially malicious. If not, the result of the scan is inconclusive.

It will be appreciated by those skilled in the art, that in some circumstances it may be advantageous to pre-process a file by transforming the file, prior to scanning by processor 470. Thus, (i) files such as Java applets, which include byte code, may be disassembled prior to processing; and (ii) files that are encoded may be decoded prior to processing. Moreover, (iii) files of a specific mime type that generally have a substantially non-uniform byte distribution, such as a normal distribution, may be pre-processed by transforming them to files with a substantially uniform byte distribution; specifically, the individual byte value are transformed to other byte values, so that the resulting histogram has a substantially uniform distribution.

In reading the above description, persons skilled in the art will realize that there are many apparent variations that can be applied to the methods and systems described. Thus it will be appreciated that the methods described apply to general hypothesis analysis of files, including inter alia security analysis, type analysis and author analysis.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-based method for scanning files for security, comprising:
    receiving, by a computer, an unfamiliar file for scanning;
    generating, by the computer, a histogram of frequencies of occurrence of a plurality of byte values within a buffer of file data from the unfamiliar file, excluding frequencies for a designated set of byte values from the plurality of byte values; and
    if the generated histogram of non-excluded frequencies deviates substantially from a reference frequency distribution, then signaling, by the computer, that the unfamiliar file is potentially malicious.

2. The method of claim 1 further comprising transforming, by the computer, the unfamiliar file prior to said generating a histogram.

3. The method of claim 2 wherein said transforming comprises decoding the unfamiliar file.

4. The method of claim 2 wherein said transforming comprises disassembling byte code in the unfamiliar file.

5. The method of claim 2 wherein said transforming comprises transforming the bytes of the unfamiliar file to transformed byte values.

6. The method of claim 1 further comprising determining, by the computer, if a mime type of the unfamiliar file is suitable for analysis.

7. The method of claim 1 wherein the reference frequency distribution is a uniform distribution.

8. The method of claim 7 further comprising calculating, by the computer, an average of the non-excluded frequencies within the buffer of file data, and wherein the histogram of non-excluded frequencies is deemed to deviate substantially from the reference uniform distribution if any of the non-excluded frequencies deviates substantially from the calculated average.

9. The method of claim 8 wherein a non-excluded frequency is deemed to deviate substantially from the calculated average if the frequency exceeds the product of a threshold multiplier and the average.

10. The method of claim 1 further comprising deriving, by the computer, the designated set of byte values whose frequencies are excluded from the histogram by processing a training set of non-malicious files.

11. A computer system for scanning files for security, comprising:
a computer processor; and
a memory unit storing:
instructions for a histogram generator, executed by said computer processor, for building a histogram of frequencies of occurrences of a plurality of byte values within a buffer of file data from an unfamiliar file, excluding frequencies of a designated set of byte values from the plurality of byte values; and
instructions for a threshold detector, executed by said computer processor, for detecting if the histogram of the non-excluded frequencies generated by said histogram generator deviates substantially from a reference frequency distribution.

12. The computer system of claim 11 wherein said memory unit further comprises instructions for a file pre-processor, executed by said computer processor, for transforming the unfamiliar file prior to said histogram generator building the histogram of frequencies.

13. The computer system of claim 12 wherein said file pre-processor decodes the unfamiliar file.

14. The computer system of claim 12 wherein said file pre-processor disassembles byte code in the unfamiliar file.

15. The computer system of claim 12 wherein said file pre-processor transforms the bytes of the unfamiliar file to transformed byte values.

16. The computer system of claim 11 wherein said memory unit further comprises instructions for a mime type filter, executed by said computer processor, for determining whether a mime type of the unknown file is of a type deemed suitable for byte-distribution analysis.

17. The computer system of claim 11 wherein the reference frequency distribution is a uniform distribution.

18. The computer system of claim 17 wherein said storage unit further comprises instructions for an average calculator, executed by said computer processor, for calculating an average of frequencies of occurrence of the plurality of bytes within the buffer of file data, excluding frequencies of the designated set of bytes, and wherein said threshold detector detects that the histogram of frequency values of the non-excluded bytes deviates substantially from the reference uniform distribution if any of the frequencies of the non-excluded bytes deviates substantially from the average calculated by said average calculator.

19. The computer system of claim 18 wherein said threshold detector detects that a frequency of a non-excluded byte deviates substantially from the calculated average if the frequency exceeds the product of a threshold multiplier and the average.

20. The computer system of claim 11 wherein said storage unit further comprises instructions for a training processor, executed by said computer processor, for deriving the designated set of byte values whose frequencies are excluded from the histogram by processing a training set of non-malicious files.

21. A non-transitory computer-readable storage medium storing program code for causing a computing device:
to receive an unfamiliar file for scanning;
to generate a histogram of frequencies of occurrence of a plurality of byte values within the buffer of file data, excluding frequencies for a designated set of byte values from the plurality of byte values; and
if the generated histogram of non-excluded frequencies deviates substantially from a reference frequency distribution, then to signal that the unfamiliar file is potentially malicious.

* * * * *